US009332423B2

(12) United States Patent
Jeyakeerthi

(10) Patent No.: US 9,332,423 B2
(45) Date of Patent: May 3, 2016

(54) METHODS AND SYSTEMS FOR SYSTEM UPDATING OF MOBILE DEVICES OPERATING IN PRIVACY OR OTHER INFORMATIONALLY RESTRICTED MODES

(71) Applicant: Google Technology Holdings LLC, Mountain View, CA (US)

(72) Inventor: Jeyappragash J. Jeyakeerthi, Sunnyvale, CA (US)

(73) Assignee: Google Technology Holdings LLC, Mountain View, CA (US)

(*) Notice: Subject to any disclaimer, the term of this patent is extended or adjusted under 35 U.S.C. 154(b) by 104 days.

(21) Appl. No.: 14/147,045

(22) Filed: Jan. 3, 2014

(65) Prior Publication Data

US 2015/0148021 A1 May 28, 2015

Related U.S. Application Data

(60) Provisional application No. 61/909,462, filed on Nov. 27, 2013.

(51) Int. Cl.
*H04W 8/24* (2009.01)
*G06F 9/445* (2006.01)
*H04W 4/08* (2009.01)

(52) U.S. Cl.
CPC . *H04W 8/24* (2013.01); *G06F 8/65* (2013.01); *H04W 4/08* (2013.01)

(58) Field of Classification Search
None
See application file for complete search history.

(56) References Cited

U.S. PATENT DOCUMENTS

| | | | |
|---|---|---|---|
| 2003/0143991 A1 | 7/2003 | Minear et al. | |
| 2006/0106806 A1* | 5/2006 | Sperling et al. | 707/10 |
| 2007/0300215 A1* | 12/2007 | Bardsley | 717/168 |
| 2011/0314145 A1* | 12/2011 | Raleigh et al. | 709/224 |
| 2013/0326493 A1* | 12/2013 | Poonamalli et al. | 717/168 |
| 2014/0047429 A1* | 2/2014 | Gaither et al. | 717/170 |

* cited by examiner

*Primary Examiner* — Daniel Lai
(74) *Attorney, Agent, or Firm* — Wolfe-SBMC

(57) ABSTRACT

A method (600) of providing device updates or personalization to a mobile communication device (706) operating in an informationally restrictive mode is provided. The method can include querying 707 a plurality of mobile communication devices 701,702,703,704,705,706 operating in a distributed system 700. Information from mobile communication devices operating in a less informationally restrictive mode is clustered 708. Each cluster 718 includes a representation of device usage, device configuration, or combinations thereof. Indicia 709,710 are transmitted 711 to mobile communication devices operating in the more informationally restrictive mode. Matching cluster 713 from at least one mobile communication device 706 is received 714, optionally with operational information 715. Operations 717 can be executed 716 in response to the operational information 715.

20 Claims, 5 Drawing Sheets

METHODS AND SYSTEMS FOR SYSTEM UPDATING OF MOBILE DEVICES OPERATING IN PRIVACY OR OTHER INFORMATIONALLY RESTRICTED MODES

CROSS REFERENCE TO PRIOR APPLICATIONS

This application claims priority and benefit under 35 U.S.C. §119(e) from U.S. Provisional Application No. 61/909,462, filed Nov. 27, 2013, which is incorporated by reference for all purposes.

BACKGROUND

1. Technical Field

This disclosure relates generally to systems, and more particularly to communication systems for electronic devices.

2. Background Art

The design of electronic devices, including mobile communication devices, portable computing systems, tablet devices, and the like, is continually evolving. Using a mobile telephone as an example, only a few years ago such a device was only capable of making voice calls with a dedicated cellular network. Today, however, "smart phones" are capable not only of making voice calls with cellular networks, but also data communications with Wi-Fi and other data networks as well.

When such devices communicate data, it can be advantageous for system administrators to pull specific data from the devices to understand how they are used and configured. For example, a system administrator may be able to pull configuration data to determine when to deliver software updates, product upgrades, and so forth.

Users of these devices may be concerned about how the data in these devices is used by various system administrators. Accordingly, device manufacturers have begun to introduce certain setting controls, feature controls, and preference controls that restrict how the device functions, transmits data, communicates with remote servers and devices, and so forth. For example, some devices include privacy settings that allow the device user to designate whether certain information can be collected, uploaded, or otherwise accessed by remote systems and devices. A device operating in a privacy mode may transmit little or no data to remote devices, while a device operating in a non-privacy mode may freely transmit all kinds of information about its configuration and user to remote devices. It becomes the user's decision whether to allow such data to be transmitted to remote devices.

Problems can arise, however, when a device is operating in a privacy mode. To illustrate by example, since configuration data may not be transmitted to remote parties, it can be difficult to properly deliver necessary software patches, product upgrades, and the like to a mobile device due to the fact that the purveyor of these items is not able to know whether the items are needed. It would be advantageous to have a system capable of overcoming such issues.

Figure 1:
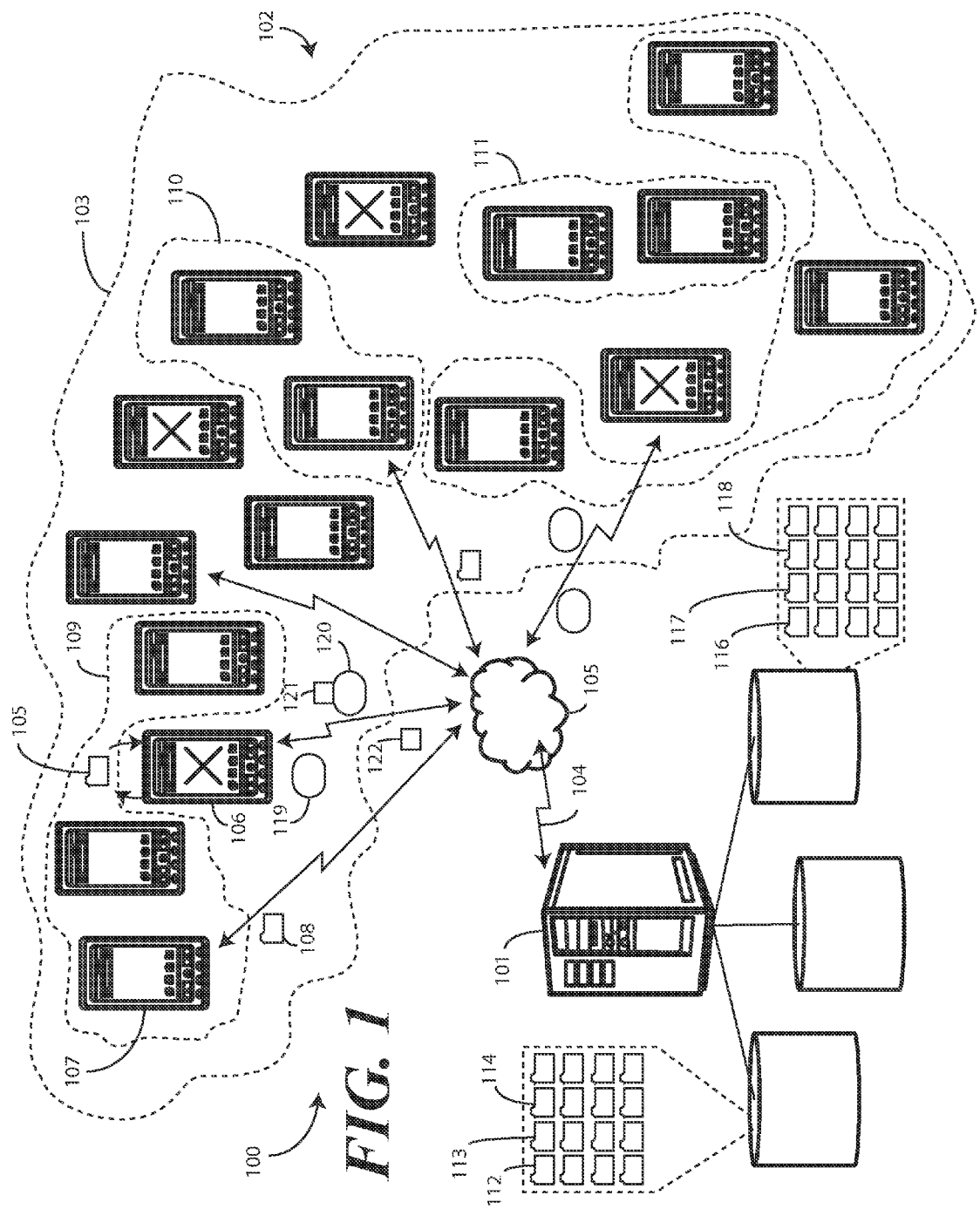
FIG. 1 illustrates one explanatory system configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related clustering communication devices to determine cluster indicia, transmitting that indicia to one or more devices, and receiving matching cluster indicia in response to allow a device, operating in a more informationally restricted mode, for example, to receive system updates, operational features, presentation data, and so forth. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of performing clustering to obtain information about communication devices operating in a first mode, transmitting some or all of the information to communication devices operating in a second mode, and receiving matching information from the devices operating in the first mode as described herein. The non-processor circuits may include, but are not limited to, a radio receiver, a radio transmitter, signal drivers, clock circuits, power source circuits, and user input devices. As such, these functions may be interpreted as steps of a method to perform clustering, receiving, matching, transmitting, and the other method steps described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present disclosure provide methods and systems allowing the user of a communication device to operate that device is a high data privacy mode while still receiving update features, such as software updates, firmware updates, patches, and the like. For simplicity, the communication device will be referred to as a mobile device or mobile communication device in the discussion that follows. It will be clear to those of ordinary skill in the art having the benefit of this disclosure, however, that embodiments of the disclosure can be readily applied to many types of client-server systems, be they mobile or dedicated, wireless or wired, and so forth.

In one embodiment, both a server complex and a mobile device have one or more processors or control circuits configured to perform clustering operations to determine device usage and configuration data. For example, the one or more processors or control circuits can perform iterative clustering operations on a continual basis to micro-level data points. In the server complex, the micro-level data analysis can be applied to mobile devices in communication with the server complex that are not operating in a high data privacy mode. In the mobile device, the micro-level data analysis can be applied to usage patterns, device configuration, or other device characteristics.

The clustering analysis occurring in the server complex analyzes micro-level data points received from a large group of mobile devices operating in a public mode, i.e., not in a high data privacy mode, that are in communication with the server complex. ("Micro-level" data points refer to data points along temporal extensions of cluster feature vectors in clustering operations.) The clustering analysis can be applied continually in one or more embodiments. In one or more embodiments, the micro-level data points can be related to the operating characteristics and/or usage patterns of the group of mobile devices. The analysis of these data points by the server complex can be performed to determine, for example, whether to provide software and/or firmware update patches to the mobile devices, with those software and/or firmware update patches targeted at enhancing the operating characteristics of the devices.

At the same time, one or more mobile devices operating in the high data privacy mode may also have one or more processors performing parallel clustering operations. For example, a mobile device may be executing the same, or substantially similar, clustering operations as those occurring in the server complex. Moreover, in one or more embodiments, the mobile device may be configured with the same initial conditions as the server complex such that the resulting matrices defining the resulting clusters are similar to those found in the server complex. However, the micro-level data points analyzed by the mobile device correspond to its own operating characteristics and usage patterns, not those of other device. The mobile device can collect micro-level data points at different times and/or conditions. Further, the mobile device can continue to perform a streaming and iterative clustering operation. This local clustering operation can be performed on the same set of dimensions as is occurring in the server complex. The result is a locally stored device matrix defining a cluster for the device at any given time.

Since the server complex does not receive configuration and usage data from the mobile device when operating in a high data privacy mode, in one embodiment the mobile device can transmit requests to the server complex for metadata from the set of data clusters and the associated data cluster categories that have been generated from the devices operating in the public mode at the server. This metadata can then be transmitted to the mobile device. In one or more embodiments, the transmission is contingent on at least a predetermined number of clustering iterations, M, having been completed on the micro-level data points of the public mode devices by the server complex. In one embodiment, the transmitted metadata contains a map of each cluster and a set of available operations or actions that are associated with that cluster and that the server complex can perform to and/or for the mobile device.

In one embodiment, after receiving the metadata from the server complex, one or more processors or control circuits of the mobile device can perform a matching operation. In the matching operation, the one or more processors or control circuits of the mobile device compare the locally stored matrix with that defined by the received metadata to determine to which server defined cluster the locally stored matrix is most similar. In one embodiment, every matching operation consults the metadata to not only find the most closely matching cluster, but to determine the one or more server complex operations available to the most closely matching cluster. Accordingly, the mobile device can identify suggested operations that are available to the most closely matching cluster. As noted above, available operations can include system updates, alteration of operational features, presentation of data on a display, and the like. Examples include local operations in the mobile device such as turning off the transmission of background data, reducing the brightness of the display. Alternatively, the operation could involve receiving a software and/or firmware patch. The mobile device can then request the operation where desired by the user.

Advantageously, using this "dual-clustering and matching" method, a mobile device operating in a high data privacy mode can request the available operation from the server complex without transmitting any private information to the server. At the same time, the mobile device is able to obtain highly personalized, device specific, and targeted actions and operations that are relevant to the mobile device. The dual-clustering and matching method can be extended to other server complex operations, including targeted marketing data delivery, device personalization under high data privacy to enrich user experiences, and the like, without user or device having to give out their private data.

Turning now to FIG. 1, illustrated therein is one system 100 configured in accordance with one or more embodiments of the disclosure. The system 100 includes a server complex 101 and a plurality of mobile devices 102. While one server complex 101 is shown, it will be obvious to those of ordinary skill in the art having the benefit of this disclosure that the server complex 101 can be one or more server complexes. The server complex 101 can be configured as hardware, software, processing logic, or combinations thereof that are designed, arranged, and/or configured to execute the methods and steps described herein. In one embodiment, the server complex 101 can be a single hardware system deployed at a remote location. In other embodiments, the server complex 101 can be distributed using multiple hardware components located across different physical locations. The server complex 101 can perform various processes related to clustering, transmitting, receiving, information and data.

The mobile communication devices of the plurality of mobile devices 102 can be any type of a variety of devices, including a desktop, laptop, netbook, or tablet computer, mobile communication devices, personal digital assistants, gaming devices, media players, tablet or palmtop computers, and so forth. As noted above, for ease of illustration the devices will be referred to as being mobile or portable. However, embodiments of the disclosure are not so limited.

In one embodiment, each device of the plurality of mobile devices 102 operates in a distributed network 103. In one embodiment, at least some of the distributed network 103 is in communication 104 with the server complex 101. In one embodiment, each device of the plurality of mobile devices 102 is in wireless communication with the server complex 101 across a network 105.

In one embodiment, at least some of the mobile devices, e.g., mobile device 106, operate in a privacy mode. By contrast, in one embodiment at least some other mobile devices, e.g., mobile device 107, operate in an open, or public, mode. As used herein, the privacy mode refers to an operating mode of a mobile device 106 where data transmission occurs in an informationally restrictive manner. For example, a privacy mode can apply to one or more ways of handling, accessing, processing, storing, or treating data, user communications, or the like. In one embodiment, the privacy mode may be applicable to the collection, sharing, distributing, displaying, storing, securing, copying, deleting, management, and/or processing of user data. In another embodiment, a privacy policy may relate to user communications and, therefore, influence what information can be shared with whom and under what circumstances. As yet another example, a privacy policy may be related to the manner and/or extent to which use data or information is processed, handled, stored, or maintained.

In one or more embodiments, when a mobile device 106 operates in a privacy mode, the server complex 101 is unable to aggregate usage and configuration about the mobile device 106. By contrast, when a mobile device 107 operates in a public mode, the server complex 101 may query or poll that mobile device 107 to obtain usage and configuration information pertaining thereto. When this occurs, the server complex 101 is able to offer upgrades, fixes, patches, product features, and other benefits to the user of the mobile device 107 operating in the public mode. For example, if the server complex 101 determines that the mobile device 107 operating in the public mode is running a particular application or operating system, the server complex 101 can check to see of there are any software updates for the application or operating system. Where there are, the server complex 101 can offer that update to the mobile device 107 operating in the public mode. Similarly, if the user of the mobile device 107 operating in the public mode makes 32 calls a month, with an average talk time of five minutes per call, and watches video for ten hours per month, the server complex 101 can offer products and services that complement this usage profile.

As noted above, it is contemplated that there are use cases in which the user of a mobile device 106 operating in the privacy mode would like to receive the software and/or firmware updates, product offerings, service features, benefits, and so forth that are being offered to users of mobile devices operating in the public mode. However, the server complex 101 is unable to determine what to offer a mobile device 106 operating in the privacy mode because the server complex 101 cannot determine device configuration or usage patterns due to the inability to gather data while the mobile device 106 is operating in a more informationally restrictive mode than mobile device 107. Embodiments of the disclosure provide a solution to this problem, as described below.

In one embodiment, the server complex 101 performs, with one or more processors, a clustering operation on data streams 108 received from the mobile devices operating in the public mode. In one embodiment, the clustering operations comprise k-means clustering, although other clustering techniques, including k-medoids clustering or other clustering can also be used. Clustering operations include methods of vector quantization that can be used for data mining operations. In a clustering operation, the one or more processors of the server complex 101 work to partition N observations into K clusters, where each observation belongs to a defined cluster having a mean, with the mean being nearer than any other cluster mean to the observation. In FIG. 1, explanatory clusters are shown as clusters 109,110,111. The mean of each cluster 109,110,111 serves as an exemplar observation for the cluster. By performing clustering operations, the server complex 101 can partition the distributed network 103 into what is known in the art as "Voroni cells." Heuristic algorithms can be employed in conjunction with the clustering operations to efficiently determine the mean of each cluster. Some are similar to expectation-maximization techniques used in iterative refinement of mixtures of Gaussian distributions. The cluster means can then be used to model the data in the form of a matrix of the number of vectors for each cluster.

In one or more embodiments, the clustering operations are iterative. The data stream 108 can be considered as an infinite stream that evolves across time. Accordingly, determined clusters can vary based upon the time at which they are defined and the amount of time across which they are measured. In one embodiment, the clustering operations are applied at a micro-level, which provides an efficient process for determining desired summary statistics of, for example, mobile device configuration or mobile device usage patterns, in a rapidly evolving data stream.

As noted above, in one embodiment the server complex 101 performs iterative k-means clustering operations on a continuing basis to the mobile devices operating in the public mode in the distributed network 103. Transmission of micro-level data points from the mobile devices operating in the public mode to the server complex 101 occurs because those devices are operating in a less informationally restrictive mode than are the mobile devices operating in the privacy mode. The micro-level data points transmitted can be related to the operating characteristics, device configuration, usage patterns, or combinations thereof for the group of mobile devices operating in the public mode. The server complex 101 can then generate indicia 112,113,114 of at least some of the one or more clusters 109,110,111. The indicia 112,113,114 can be in the form of a matrix for each cluster 109,110,111 in one or more embodiments. These indicia 112,113,114 can be in the form of a cluster map as well. One form of a cluster map is a matrix defined by the vectors of device configuration or usage of importance to the server complex 101. From these indicia 112,113,114, the server complex 101 can provide software and/or firmware update patches to the mobile devices aimed at enhancing the devices' operating characteristics.

In one or more embodiments, an aggregated set of micro-level data points is continually analyzed and partitioned into subsets of clusters, with the derived set of clusters 109,110, 111 determined to be "useful" once a threshold number of iterations (M) is applied to a threshold number of "valid" micro-level data points. Once M iterations are complete, the server complex 101 can link each of the derived clusters 109,110,111 to a predefined data cluster category. Once clustering is established, in one embodiment the server complex 101 can associate various operations 116,117,118 with the clusters 109,110,111. The server complex 101 can uses this association of various operations 116,117,118 with the clusters 109,110,111 to target operations towards mobile devices operating in the public mode in individual clusters. Some of the various operations 116,117,118 that can be done to improve the user experiences on the devices are suggesting battery optimization techniques, targeting software patches, install or remove certain applications, turning off background data. This list is illustrative only, as other operations will be obvious to those of ordinary skill in the art having the benefit of this disclosure. For example in the case of a software update operations, each cluster 109,110,111 can be analyzed to identify and root cause issues which might result in fixes in one or more components. These fixes are grouped together to target these clusters. Once these patches are mapped to each cluster 109,110,111 this table is stored and transmitted on request to the devices.

Accordingly, in one embodiment the server complex 101 is to cluster information from data streams 108 of mobile devices operating in the public mode to define indicia 112, 113,114 in the form of cluster maps indicative of device usage, device configuration, or combinations thereof, for mobile communication devices operating in the privacy mode. In one embodiment, since the mobile devices operating in the privacy mode are not included in this clustering operation, those mobile devices perform a complementary clustering operation. Thus, mobile device 106, which is operating in the privacy mode, is to cluster information from its own internal processes to define indicia 115 in the form of a cluster map indicative of its own device usage, device configuration, or combinations thereof. Said differently, in one embodiment the mobile device 106 operating in the privacy mode performs, with one or more processors, a clustering process to cluster information from one or more memory devices of the mobile communication device into one or more clusters, each of the one or more clusters comprising a representation of device usage, device configuration, or combinations thereof for the mobile communication device.

To ensure that the clustering process occurring in the server complex 101 and the mobile device 106 operating in the privacy mode are similar, in one embodiment, the mobile device 106 requests cluster process information 122 from the server complex 101. When this cluster process information 122 is received, the mobile device 106 can configure its clustering operations based upon the clustering information so that its clustering methods will be substantially similar to those occurring in the server complex 101.

Accordingly, in one embodiment a mobile device 106 operating in the privacy mode can perform the same or substantially similar clustering operation that is occurring in the server complex 101. Moreover, the cluster process information 122 can include the same initial conditions, so that the indicia 115 in the mobile device 106 operating in the privacy mode results in a matrix or cluster map by the same process. The mobile device 106 operating in the privacy mode can collect data points at different times and/or conditions. Additionally, it can continue, on an iterative basis in one embodiment, to perform a streaming and iterative clustering operation. This "local" clustering can be performed on the same set of dimensions in accordance with the cluster process information 122. This results in the mobile device 106 operating in the privacy mode having indicia 115, as a matrix, cluster map, or other, that defines its own cluster at any given time.

While the server complex 101 does not receive device configuration or usage information from mobile devices operating in the privacy mode in one or more embodiments, the server complex 101 can determine that those devices are operating in the distributed network 103 in one embodiment. Mobile devices operating in the privacy mode can still deliver basic information to the server complex, such as device identifiers, such as a unique device identifier (UDID), international mobile equipment identity (IMEI), or international mobile subscriber identity (IMSI), just to name a few. Accordingly, in or more embodiments, the server complex 101 is to automatically learn of mobile devices operating in the privacy mode during clustering operations. This can be accomplished by receiving, for example, one of these identifiers. In other embodiments, the mobile device 106 operating in the privacy mode can seek out the server complex 101 by receiving a corresponding identifier as well.

Regardless of how the mobile device 106 operating in the privacy mode and the server complex come into communication, in one embodiment, the server complex 101 is configured to transmit the at least one cluster map 119, with each cluster map having various operations 116,117,118 associated therewith, to the mobile device 106 operating in the privacy mode. In one embodiment, the cluster map 119 can comprise the indicia 112,113,114 of the one or more clusters 109,110,111 corresponding to the devices operating in the public mode in the distributed network 103.

Upon receipt of the cluster map 119, the mobile device 106 operating in the privacy mode can match its indicia 115, which can be in the form of a correspondingly defined cluster map, to the indicia 112,113,114 set forth in the cluster map 119 to see with which cluster 109,110,111 the mobile device 106 operating in the privacy mode is most closely aligned. Where this is determined, the mobile device 106 operating in the privacy mode can transmit a matching cluster 120 back to the server complex 101.

In addition to transmitting the matching cluster 120 back to the server complex, in one embodiment the mobile device 106 operating in the privacy mode can select operational information of the one or more of the various operations 116,117,118 that were associated with the matching cluster 120. The mobile device 106 operating in the privacy mode can then transmit the one or more selected operations 121 to the server complex 101.

The server complex 101, upon receiving confirmation of a device cluster map matching one or more cluster maps 119 from the mobile device 106, operating in the privacy mode can then perform the requested operations found in the one or more selected operations 121. Illustrating by example, the server complex 101 may update the mobile device 106 operating in the privacy mode, such as by transmitting an operating system or application patch, revision, or update. Alternatively, the server complex 101 may control an operation of the mobile device 106 operating in the privacy mode, such as by adjusting data transmission rates, display brightness, adjusting processor speed to extend battery life, turning ON or OFF applications, and so forth. Other examples of operations have been previously noted. Still others will be obvious to those of ordinary skill in the art having the benefit of this disclosure. Advantageously, using the system 100 and method described above, any mobile device 106 operating in the privacy mode can receive highly personalized and targeted actions that are relevant to the device or its user without sharing any of the device's private information with the server complex 101. The system 100 of FIG. 1 can be extended to other operations like targeted marketing or device personalization to enrich user experiences without user or device having to share private data.

Figure 2:
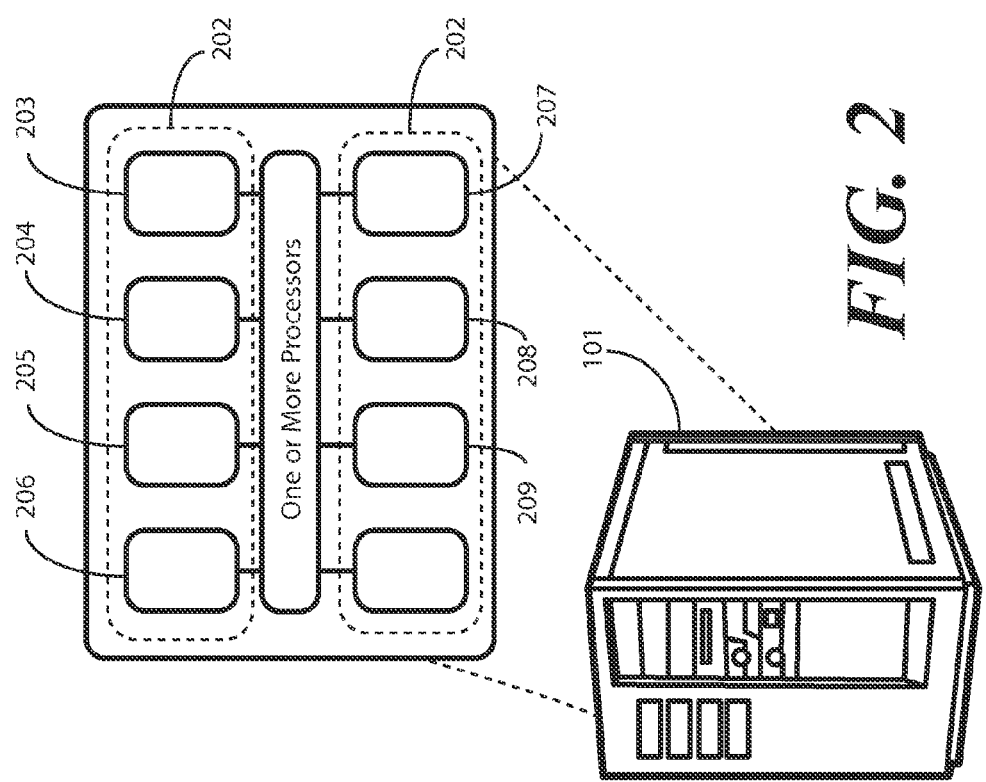
FIG. 2 illustrates an explanatory server complex configured in accordance with one or more embodiments of the disclosure.

Turning now to FIG. 2, illustrated therein is one embodiment of a server complex 101 suitable for use with one or more embodiments of the disclosure. As noted, the server complex 101 may include one or more processors 201. The one or more processors 201 may be operable with one or more memory devices 202. The one or more memory devices 202 can be used to store the cluster information 203 from mobile communication devices operating in the public mode. The one or more memory devices 202 can also store cluster maps 204, matrices 205, or other indicia 206 indicating device usage, device configuration, or combinations thereof, of the mobile communication devices operating in the public mode. The one or more processors 201 can transmit, in one embodiment, at least one cluster map 204 stored in the one or more memory devices 202 to one or more mobile communication devices operating in a privacy mode. Further, the one or more processors 201 can receive, and optionally store in the one or more memory devices 202, a confirmation 207 of a device cluster map matching the transmitted cluster maps 204 from at least one mobile communication device operating in the privacy mode.

Additionally, the one or more memory devices 202 can store operational information 208 associated with the cluster maps 204, matrices 205, or other indicia 206 indicating device usage, device configuration, or combinations thereof, of the mobile communication devices operating in the public mode. The one or more processors 201 can associate the operational information 208 with the cluster maps 204, matrices 205, or other indicia 206 indicating device usage, device configuration, or combinations thereof, of the mobile communication devices operating in the public mode.

In one embodiment, the one or more processors 201 can, when receiving the confirmation 207 of the device cluster map matching the transmitted cluster maps 204, receive operational information 209 associated with the matching cluster identified by the confirmation 207 of the device cluster map matching the transmitted cluster maps 204. The one or more processors 201 can then execute an operation associated with the operational information 209 associated with the matching cluster identified by the confirmation 207 of the device cluster map matching the transmitted cluster maps 204. Examples of operations include updating the mobile communication devices operating in the private mode, altering an operational feature of the mobile communication devices operating in the private mode, or delivering data for presentation on a display of the mobile communication devices operating in the private mode. Examples of delivering a system update include delivering software updates, firmware updates, patches, and so forth. Examples of executing an operation would be altering data transmission rates, altering what data is sent or received from the mobile communication devices operating in the private mode, adjusting operation to extend battery life of the mobile communication devices operating in the private mode, adjusting the brightness of a display of the mobile communication devices operating in the private mode, adjusting the volume of the mobile communication devices operating in the private mode, and so forth. Examples of delivering data for presentation on the display include delivering marketing information to the mobile communication devices operating in the private mode, delivering personalized communications to the mobile communication devices operating in the private mode, delivering alerts to the mobile communication devices operating in the private mode, and so forth.

Figure 3:
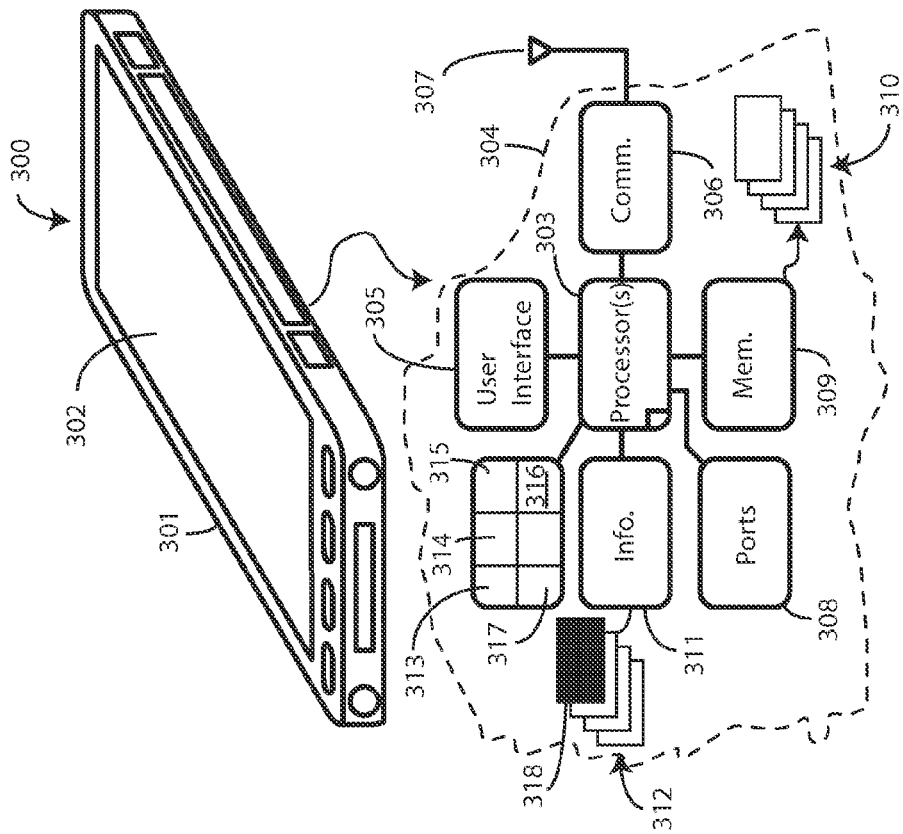
FIG. 3 illustrates one explanatory mobile communication device configured in accordance with one or more embodiments of the disclosure.

Turning now to FIG. 3, illustrated therein is one explanatory mobile communication device 300 configured in accordance with one or more embodiments of the disclosure. The explanatory mobile communication device 300 is shown as a smart phone for ease of illustration. However, it will be obvious to those of ordinary skill in the art having the benefit of this disclosure that other portable electronic devices may be substituted for the explanatory smart phone as noted above. The mobile communication device 300 may be configured as a palm-top computer, a tablet computer, a gaming device, wearable computer, a remote controller, a media player, laptop computer, portable computer, or other electronic device.

The mobile communication device 300 includes a housing 301. In one embodiment, a display 302 is disposed along the front surface of the housing 301 of the mobile communication device 300. In one embodiment, the display 302 is configured to provide visual output, images, or other visible indicia to a user. In one embodiment, the display 302 comprises an organic light emitting diode (OLED) device. In one embodiment, the display 302 comprises a touch sensor to form touch sensitive display configured to receive user input across the surface of the display 302. The display 302 can also be configured with a force sensor. Where configured with both a touch sensor and force sensor, one or more processors 303 of the mobile communication device 300, operable with the touch sensor and the force sensor, can determine not only where the user contacts the display 302, but also how much force the user employs in contacting the display 302.

In FIG. 3, the explanatory mobile communication device 300 is shown illustratively with a schematic block diagram 304. In this embodiment, the mobile communication device 300 includes a user interface 305, which can include the display 302. The illustrative mobile communication device 300 also includes a communication circuit 306 that can be configured for wired or wireless communication with one or more other devices or networks such as network (105) from FIG. 1. The networks can include a wide area network, a local area network, or personal area network as well. The communication circuit 306 can include wireless communication circuitry, one of a receiver, a transmitter, or transceiver, and one or more antennas 307.

The mobile communication device 300 includes one or more processors 303, which can have one or more control circuits. The one or more processors 303 are responsible for performing the various functions of the device. The one or more processors 303 can be a microprocessor, a group of processing components, one or more Application Specific Integrated Circuits (ASICs), programmable logic, or other type of processing device. The one or more processors 303 can be operable with the user interface 305 and the communication circuit 306, as well as various peripheral ports 308 that can be coupled to peripheral hardware devices via interface connections.

The one or more processors 303 can be configured to process and execute executable software code to perform the various functions of the mobile communication device 300. A storage device, such as memory 309, stores the executable software code used by the one or more processors 303 for device operation. The executable software code used by the one or more processors 303 can be configured as one or more modules 310 that are operable with the one or more processors 303. Such modules 310 can store instructions, control algorithms, and so forth. The instructions can instruct processors or one or more processors 303 to perform the various steps, touch sensing, and methods described below.

One module of the one or more modules 310 can be a privacy mode setting module. The user can employ this module to place the mobile communication device in a more informationally restrictive mode or a less informationally restrictive mode. One example of a more informationally restrictive mode is the privacy mode described above as compared to the public mode. One example of a less informationally restrictive mode is the public mode as compared to the privacy mode. The privacy mode setting module can be used to limit what information 311 is transmitted to a remote server complex (101).

In one embodiment, the one or more processors 303 can cluster information 311 from one or more memory devices, e.g., memory 309, of the mobile communication device 300 into one or more clusters 312. In one embodiment, each of the one or more clusters 312 comprises a representation of device usage, device configuration, or combinations thereof for the mobile communication device 300. In one embodiment, the one or more processors can create an exemplar cluster template 318 indicative of common device usage, common device configuration, or combinations thereof for the mobile communication device 300.

As noted above, the one or more processors 303 can also receive indicia 313 of one or more clusters corresponding to devices operating in a public mode in a distributed system. The one or more processors 303 can also receive operational information 314 associated with the indicia 313 of the one or more clusters corresponding to devices operating in a public mode in a distributed system.

When this occurs, the one or more modules 310 can cause the one or more processors to match cluster information of the one or more clusters 312 with the indicia 313 of one or more clusters corresponding to devices operating in a public mode in a distributed system. In one embodiment, this occurs when the mobile communication device 300 is operating in the more informationally restrictive mode than are the devices operating in the public mode of the distributed system. Where an exemplar cluster template 318 has been created, this matching can include comparing the exemplar cluster template to the one or more clusters to detect a cluster within a predetermined statistical threshold of the exemplar cluster template. The one or more processors 303 can then transmit a matching cluster 315 to the server complex sending the indicia 313 of one or more clusters corresponding to devices operating in the public mode in the distributed system.

The one or more processors 303 can also select one or more operations 316 from the operational information 314 associated with the indicia 313 of the one or more clusters corresponding to devices operating in the public mode in the distributed system. The one or more processors 303 can then transmit the operations 316 selected from the operational information 314 to a remote server complex. Once this occurs, the one or more processors 303 can receive, in response to transmitting the operations 316 selected from the operational information, command information 317. The command information 317 can comprise a system update, an operational command, and so forth.

In one or more embodiments, the one or more processors 303 can request cluster process information (122) from a remote server complex to ensure its clustering operations parallel those of the server complex. The one or more processors 303 can then configure the local clustering operations to be the same or substantially similar to those of the server complex as previously described.

Figure 4:
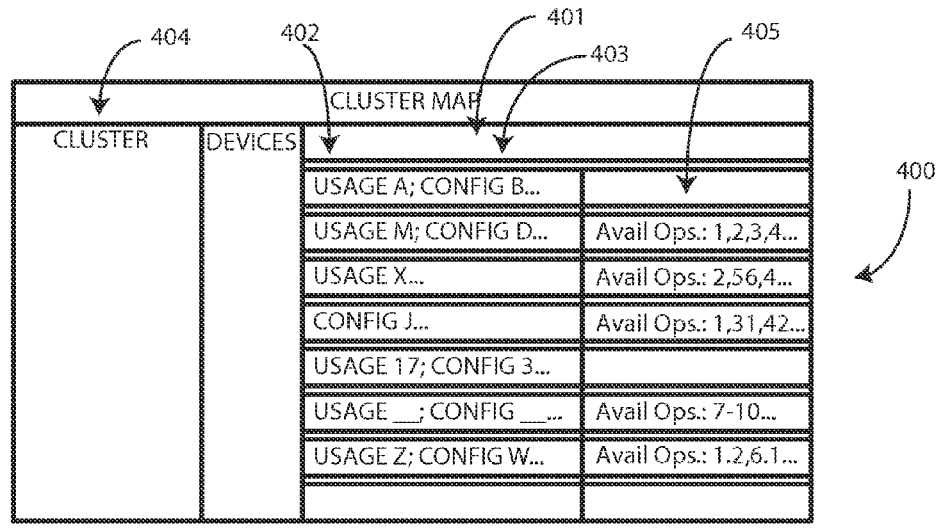
FIG. 4 illustrates explanatory indicia of clusters configured in accordance with one or more embodiments of the disclosure.

Turning now to FIG. 4, illustrated therein is one explanatory cluster map 400 configured in accordance with one or more embodiments of the disclosure. The cluster map 400 will generally be in the form of a matrix in multiple dimensions that are a function of the vectors corresponding to the micro data points. For ease of illustration, the cluster map 400 of FIG. 4 is shown as a table to illustrate some of the data that can be considered when performing the clustering operations.

Shown in column 401, a user's usage patterns 402 and device configuration 403 can be considered and associated with a cluster 404. Examples of usage patterns include the number of calls made, the number of text messages sent, the number of text messages received, the number of multimedia messages sent, the number of multimedia messages received, the amount of data transmitted, the amount of data received, the amount of video received, and so forth. Examples of device configurations include the operating system used, the number of applications used, the types of applications used, the amount of memory the operating system or applications require, the amount of processing power the operating system or applications require, the user's device settings, and so forth. Each of the micro data points can be associated into a cluster 404.

Once the clusters have been defined, one or more operations can be associated with the clusters. Examples of operations include turning off the transmission of background data, reducing the brightness of the display. Alternatively, the operation could involve receiving a software and/or firmware patch. By comparing a local cluster with the clusters 404 of the cluster map 400, a mobile communication device operating in a privacy mode can request desired operations from a server complex.

Figure 5:
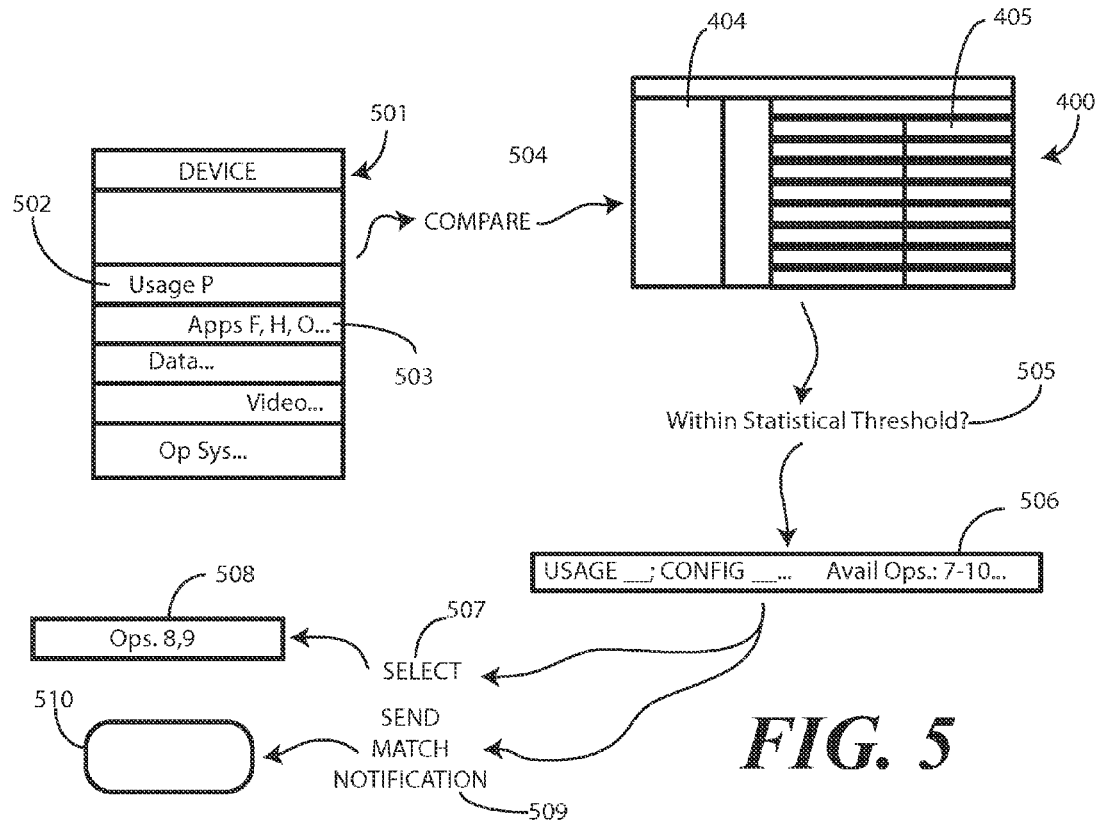
FIG. 5 illustrates one explanatory method configured in accordance with one or more embodiments of the disclosure.

Turning now to FIG. 5, illustrated therein is one explanatory method, suitable for use in a mobile communication device operating in an informationally restrictive mode, of using the cluster map 400 of FIG. 4. In one embodiment, the mobile communication device operating in the informationally restrictive mode first generates clustering information 501 from one or more memory devices of the mobile communication device into one or more clusters. In one embodiment, each of the one or more clusters comprising a representation of device usage 502, device configuration 503, or combinations thereof.

After receiving the cluster map 400, the mobile communication device can perform a compare operation 504 to match the clustering information 501 to the cluster map 400 to find which of the clusters 404 from the cluster map 400 is closest to the clustering information. In one embodiment, this compare operation 504 requires that the clustering information 501 be within a predetermined statistical threshold 505 of one of the clusters 404 from the cluster map 400.

Where the match is made, the mobile communication device can transmit 509 a matching cluster 506 to a server complex. In one embodiment, the mobile communication device can also transmit 509 a confirmation 510 that a device cluster map matched one or more clusters 404 of the cluster map 400. In one embodiment, where the cluster map includes operational information 405 associated with each cluster 404, the mobile communication device can select 507 one or more of the operations 508 from the operational information 405.

Figure 6:
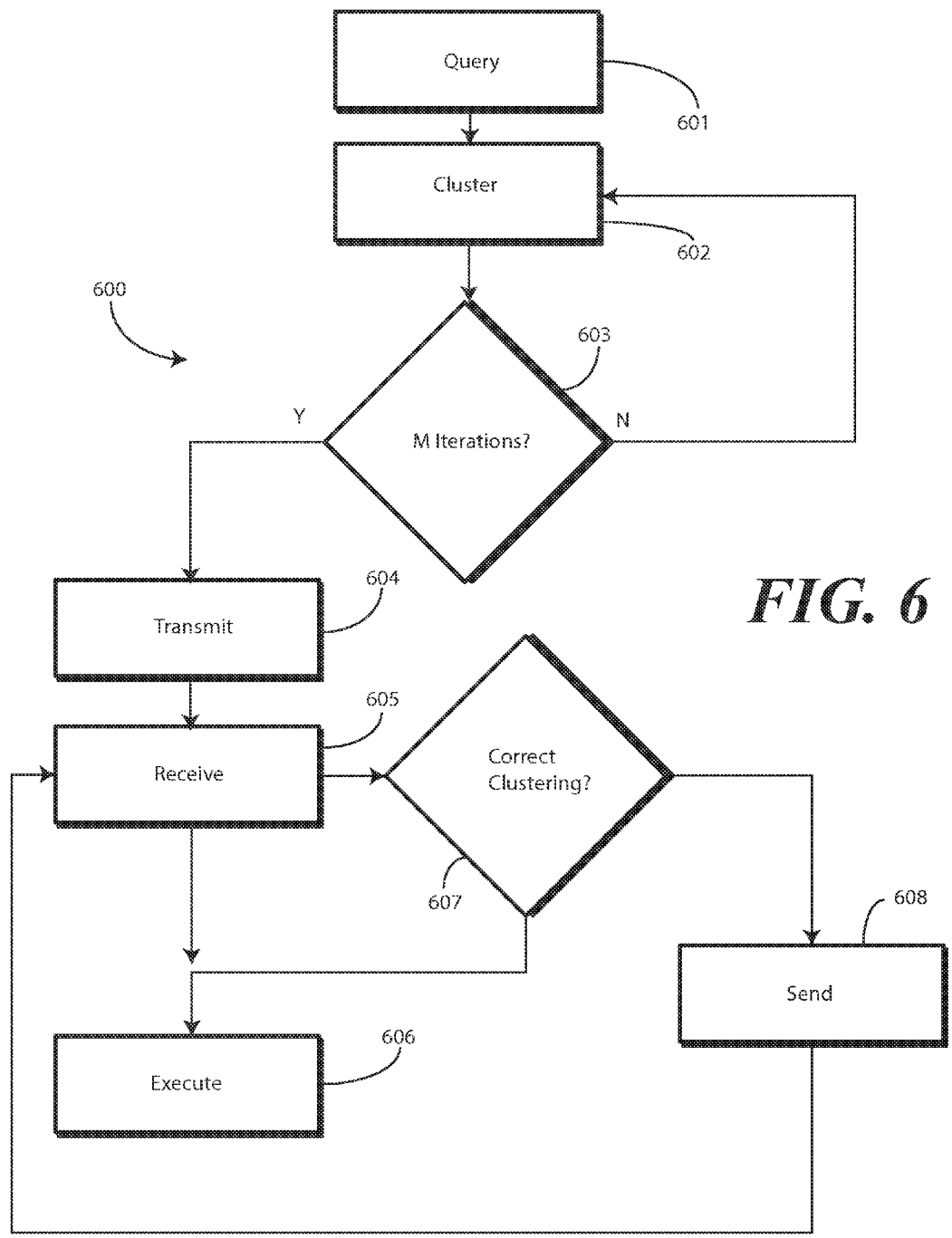
FIG. 6 illustrates one explanatory method configured in accordance with one or more embodiments of the disclosure.

Turning now to FIG. 6, illustrated therein is an explanatory method 600 suitable for use in a server complex in one or more embodiments of the disclosure. At step 601, the method 600 queries a plurality of mobile communication devices operating in a distributed system. In one embodiment, at step 601 at least some of the mobile communication devices operating in the distributed system are operating in a more informationally restrictive mode, while at least some other mobile communication devices operating in a less informationally restrictive mode. One example of a more informationally restrictive mode is the privacy mode described above as compared to the public mode. One example of a less informationally restrictive mode is the public mode as compared to the privacy mode.

At step 602, the method 600 clusters information from one or more of the mobile communication devices operating in the less informationally restrictive mode. In one embodiment, the clustering occurring at step 602 comprises k-means clustering. As previously described, other clustering techniques can be used as well. At step 602, the method 600 clusters the information into one or more clusters, where each of the one or more clusters comprising a representation of device usage, device configuration, or combinations thereof for some or all of the mobile communication devices operating in the less informationally restrictive mode.

In one embodiment, step 602 includes defining an exemplar cluster template indicative of common device usage, common device configuration, or combinations thereof, for multiple mobile communication devices operating in the less informationally restrictive mode. Step 602 can also optionally include associating available operations for the multiple ones of the at least some other mobile communication devices with the exemplar cluster template At optional decision 603, the method 600 can determine whether the derived set of data clusters results from at least a threshold number (M) of iterations so as to be determined to be "useful." Where it has, the method 600 can proceed to step 604. Where it has not, clustering can continue at step 602.

At step 604, the method 600 transmits indicia of at least some of the clusters defined by information received from the mobile communication devices operating in the less informationally restrictive mode. In one embodiment, at step 604 the method 600 transmits these indicia to mobile communication devices operating in a more informationally restrictive mode. In one embodiment, step 604 includes delivering the exemplar cluster template and the available operations to the mobile communication devices operating in the more informationally restrictive mode.

At step 605, after, in one embodiment, a mobile communication device receiving the indicia performs the method of FIG. 5, the method 600 receives a matching cluster from the mobile communication device receiving the indicia. In one embodiment, step 605 includes also receiving operational information associated with the matching cluster from the mobile communication device receiving the indicia. Where this is the case, at optional step 606, the method 600 can execute the operation associated with the received operational information. Examples of operations executed at optional step 606 include delivering a system update to the mobile communication device sending the operational information, altering an operational feature of the mobile communication device sending the operational information, delivering data for presentation on a display of the mobile communication device sending the operational information, and so forth.

In one embodiment, to ensure that the proper operation is being executed at optional step 606, the method 600 can confirm that any clustering operation occurring in the mobile communication device operating in the more informationally restrictive mode is comparable with the clustering occurring at step 602. Where it is, the method proceeds to optional step 606. Where it has not, the method 600 optionally transmits cluster process information to the mobile communication device operating in the more informationally restrictive mode at step 609.

Figure 7:
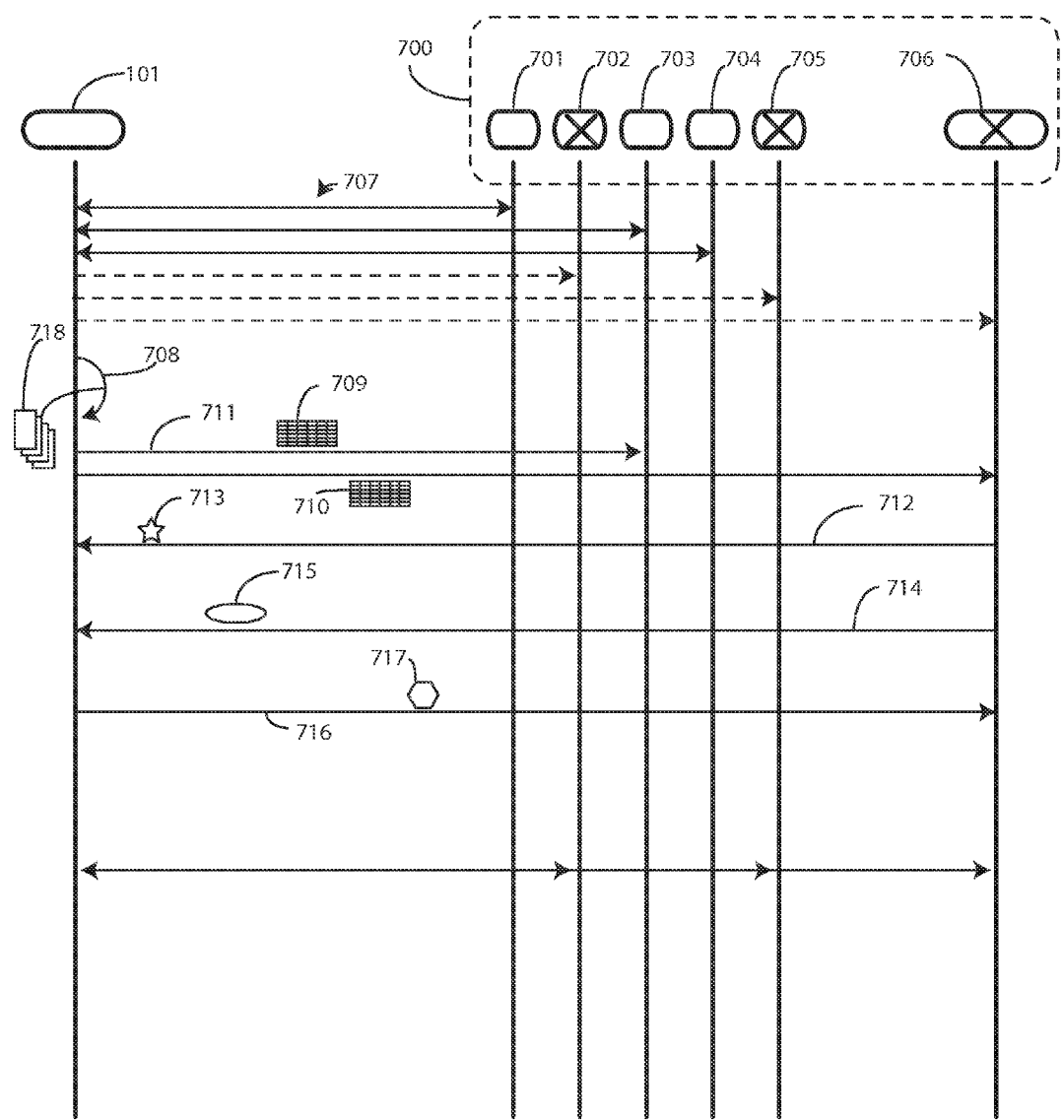
FIG. 7 illustrates one explanatory method configured in accordance with one or more embodiments of the disclosure.

The method 600 is shown operationally in FIG. 7. Turning now to FIG. 7, at a server complex 101 one or more processors is shown querying 707 a plurality of mobile communication devices 701,702,703,704,705,706 operating in a distributed system 700. In FIG. 7, at least some mobile communication devices 702,705,706 are operating in a more informationally restrictive mode and at least some other mobile communication devices 701,703,704 are operating in a less informationally restrictive mode.

The server complex 101 then clusters 708 information from one or more of the at least some other mobile communication devices 701,703,704 into one or more clusters 718. In one embodiment, each of the one or more clusters 718 includes a representation of device usage, device configuration, or combinations thereof for ones of the at least some other mobile communication devices 701,703,704.

The server complex 101 then transmits 711 indicia 709,710 of at least some of the one or more clusters one or more of the at least some mobile communication devices 703,706. The server complex 101 then receives 714 a matching cluster 713 from at least one mobile communication device 706 operating in the more operationally restrictive mode. The server complex 101 can also receive 714 operational information 715 associated with the matching cluster 713 as well. The server complex 101 can then execute 716 an operation 717 associated with the operational information 715.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
performing, with one or more processor devices of a server complex:
querying a plurality of mobile communication devices operating in a distributed system, at least some mobile communication devices operating in a more informationally restrictive mode and at least some other mobile communication devices operating in a less informationally restrictive mode;
clustering information from one or more of the at least some other mobile communication devices into one or more clusters, each of the one or more clusters comprising a representation of device usage, device configuration, or combinations thereof for ones of the at least some other mobile communication devices;

transmitting indicia of at least some of the one or more clusters to one or more of the at least some mobile communication devices; and receiving a matching cluster from at least one of the at least some mobile communication devices.

2. The method of claim 1, further comprising:
also receiving operational information associated with the matching cluster from the at least one of the at least some mobile communication devices; and
executing an operation associated with the operational information.

3. The method of claim 2, the operation comprising delivering a system update to the at least one of the at least some mobile communication devices.

4. The method of claim 2, the operation comprising altering an operational feature of the at least one of the at least some mobile communication devices.

5. The method of claim 2, the operation comprising delivering data for presentation on a display of the at least one of the at least some mobile communication devices.

6. The method of claim 1, the clustering comprising k-means clustering.

7. The method of claim 1, the at least some mobile communication devices operating in a privacy mode.

8. The method of claim 1, further comprising:
defining an exemplar cluster template indicative of common device usage, common device configuration, or combinations thereof for multiple ones of the at least some other mobile communication devices; and
associating available operations for the multiple ones of the at least some other mobile communication devices with the exemplar cluster template;
the transmitting comprising delivering the exemplar cluster template and the available operations to the one or more of the at least some mobile communication devices.

9. The method of claim 8, the receiving further comprising also receiving a selection from the available operations.

10. The method of claim 1, further comprising confirming a clustering operation occurring in the at least one of the at least some mobile communication devices is comparable with the clustering of the one or more processor devices.

11. A method, comprising:
performing, with one or more processors of a mobile communication device:
clustering information from one or more memory devices of the mobile communication device into one or more clusters, each of the one or more clusters comprising a representation of device usage, device configuration, or combinations thereof for the mobile communication device;
receiving indicia of one or more clusters corresponding to at least some devices operating in a distributed system and, based on the received indicia, creating an exemplar cluster template indicative of common device usage, common device configuration, or combinations thereof for the at least some devices operating in the distributed system;
matching the clustering information to at least one of the one or more clusters, the matching comprising comparing the exemplar cluster template to the one or more clusters to detect a cluster within a predetermined statistical threshold of the exemplar cluster template; and
transmitting a matching cluster to a server complex.

12. The method of claim 11, further comprising:
receiving operational information associated with the matching cluster;
selecting one or more operations from the operational information; and
transmitting one or more selected operations to the server complex.

13. The method of claim 12, further comprising receiving a system update from the server complex.

14. The method of claim 12, further comprising receiving an operational command from the server complex.

15. The method of claim 11, further comprising:
requesting cluster process information from the server complex; and
configuring clustering operations based upon the cluster process information.

16. The method of claim 11, wherein the common device usage, common device configuration, or combinations thereof for the at least some devices operating in the distributed system and on which the exemplar cluster template is created are operating in a public mode in the distributed system and the mobile communication device is operating in a privacy mode.

17. A system, comprising:
a server complex;
a plurality of mobile communication devices, operating in a distributed system in communication with the server complex, at least some mobile communication devices operating in a privacy mode and at least some other mobile communication devices operating in an public mode;
the server complex comprising one or more processors to:
cluster information from the at least some other mobile communication devices operating in the public mode to define cluster maps indicating device usage, device configuration, or combinations thereof for the at least some other mobile communication devices operating in the public mode;
transmit at least one cluster map to at least one mobile communication device operating in the privacy mode; and
receiving confirmation of a device cluster map matching one or more cluster maps from the at least one mobile communication device operating in the privacy mode.

18. The system of claim 17, the one or more processors to update the at least one mobile communication device operating in the privacy mode.

19. The system of claim 17, the one or more processors to control an operation of the at least one mobile communication device operating in the privacy mode.

20. The system of claim 17, the one or more processors to automatically learn of the at least one mobile communication device operating in the privacy mode during clustering operations.

* * * * *